(12) United States Patent
Mäki-Ontto et al.

(10) Patent No.: US 7,687,958 B2
(45) Date of Patent: Mar. 30, 2010

(54) PERMANENT MAGNET MODULE AND AN ELECTRICAL MACHINE ROTOR INCLUDING THE MODULE

(75) Inventors: Petri Mäki-Ontto, Espoo (FI); Pekka Kanninen, Espoo (FI); Tony Björkstrand, Vantaa (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 12/332,939

(22) Filed: Dec. 11, 2008

(65) Prior Publication Data

US 2009/0146521 A1    Jun. 11, 2009

(30) Foreign Application Priority Data

Dec. 11, 2007   (FI)   ................................. 20070964

(51) Int. Cl.
*H02K 21/12*   (2006.01)
(52) U.S. Cl. .............................. 310/156.53; 310/156.56
(58) Field of Classification Search ............ 310/156.05, 310/156.23, 156.28, 156.29, 156.31, 156.53, 310/156.56
See application file for complete search history.

(56) References Cited

U.S. PATENT DOCUMENTS 4,916,907 A * 4/1990 Munk et al. ................... 62/3.1
5,864,191 A * 1/1999 Nagate et al. ........... 310/156.54

FOREIGN PATENT DOCUMENTS

JP      2001-16808          1/2001
WO   WO 2007/116118 A1   10/2007

OTHER PUBLICATIONS

Search Report issued in priority Finnish Patent Application No. 20070964, Mar. 26, 2008, Patentti—Ja Rekisterihallitus, Helsinki, FI.

* cited by examiner

*Primary Examiner*—Dang D Le
(74) *Attorney, Agent, or Firm*—Buchanan Ingersoll & Rooney PC

(57) ABSTRACT

A permanent magnet module to be installed in a rotor includes at least two permanent magnets with the first magnetic pole on the first plane surface and the second magnetic pole on the second plane surface, and a cover at least partially enveloping the permanent magnets. The cover of the module is magnetically conductive and includes a top surface, substantially covering the first plane surface of the permanent magnet, and a bottom surface, substantially covering the second plane surface of the permanent magnet. The cover is at least partially open at the side surfaces of the permanent magnet. Also disclosed is a rotor for an electrical machine, the rotor having permanent magnets fitted into a corresponding module.

14 Claims, 7 Drawing Sheets

US 7,687,958 B2

PERMANENT MAGNET MODULE AND AN ELECTRICAL MACHINE ROTOR INCLUDING THE MODULE

The object of the invention is a permanent magnet module. Another object of the invention is an electrical machine rotor excited by permanent magnets.

Efficient permanent magnets are becoming increasingly common in the rotors of electrical machines, particularly in the rotors of synchronous machines. The magnets are based on compounds containing rare earth metals such as neodymium. In high-power synchronous machines the use of such strong permanent magnets has spread to several new application areas, often with very high requirements and difficult environmental conditions. Common features of permanent magnets based on rare earth metals include fragile structure and susceptibility to corrosion, particularly in operational environments with varying humidity and temperature.

The cooling of high-power electrical machines is arranged with coolant channels passing through the stator and rotor. One solution to cool the rotor of a permanently excited machine is comprised of radial air ducts reaching from the rotor internals to the rotor outer circumference. Air ducts are located between the sheet groups constituting the rotor core and thus divide the electromagnetically active rotor frame in parts in the direction of the rotor axis. In large electrical machines, the stator and/or rotor cores consist of modules placed next to each other in an axial direction when manufacturing the electrical machine, possibly leaving a small gap between the core modules. In rotors excited by permanent magnets, the magnets are only installed at the locations corresponding to the rotor sheet modules, as only the magnetic flux passing through them effectively participates in the machine operation. When permanent magnets embedded in the rotor are used to excite the machine, the permanent magnets must be pushed in place from the rotor end. At the same time, it must be ensured that the permanent magnets are placed at locations corresponding to the sheet modules and not at cooling ducts or other gaps.

A solution in which several permanent magnets are packed in a common casing also containing spacers separating the permanent magnets at the locations of cooling ducts is known from publication JP2001-16808. In this case, permanent magnets will be precisely placed at the iron core of the rotor, but the installed permanent magnet module will at the same time block the radial cooling duct.

When installing permanent magnets embedded to the rotor structure, the permanent magnets must also be protected against mechanical wear as the edges of the openings formed to allow for the installation of permanent magnets are not necessarily smooth and there is no practical and economical manner to smooth them. A regular permanent magnet coating such as a thin layer of resin does not provide adequate protection. A small scratch in the coating may lead to corrosion damage and further to damages to the permanent magnet.

The purpose of the present invention is to create a new permanent magnet module particularly suitable for use in a rotor of an electrical machine with permanent magnets embedded in the rotor core. In order to achieve this, the permanent magnet module according to the invention is characterized by the features specified in the characteristics section of claim 1. Correspondingly, the rotor for an electrical machine according to the invention is characterized by the features specified in the characteristics section of claim 11. Furthermore, certain preferred embodiments of the invention are characterized by the characteristics defined in dependent claims.

With the present invention, several significant benefits and improvements will be achieved, compared to earlier solutions. Handling permanent magnets in the installation phase will be easy and safe with no risk of harming the surface or structure of the permanent magnet. To replace the permanent magnets, the module can be pulled out through the installation hole.

Permanent magnets are supported in the excitation direction in perpendicular directions. Due to folds or elevations on the cover of the module, permanent magnets cannot move in the lateral or longitudinal directions, that is, parallel to the axis of the electrical machine, or in the circumferential direction.

When the electrical machine has radial cooling ducts, the mounting structure integrated in the module according to the invention ensures that the permanent magnets are correctly aligned in relation to the cooling ducts. The necessary installation play is easy to achieve with the appropriate design of the outer surface of the module casing.

According to a preferred feature of the invention, the top and bottom surfaces of the module structure is of ferromagnetic material, the flux exciting the machine passing directly from the permanent magnet towards the air gap and correspondingly towards the inner core of the rotor.

According to another preferred embodiment of the invention, the module has a semi-open structure, in which case there is no magnetically conductive material at the edges of the permanent magnet, and the stray flux cannot be closed over the ends of the permanent magnet from one pole of the permanent magnet to the opposite pole. Thus, the excitation power created by the permanent magnet is as high as possible.

According to a preferred embodiment, openings are created in the top and bottom surface of the module cover. This will reduce eddy-current losses in the module.

In the following, some of the embodiments of the invention will be described in detail by referring to the drawings, where:

Figure 3:
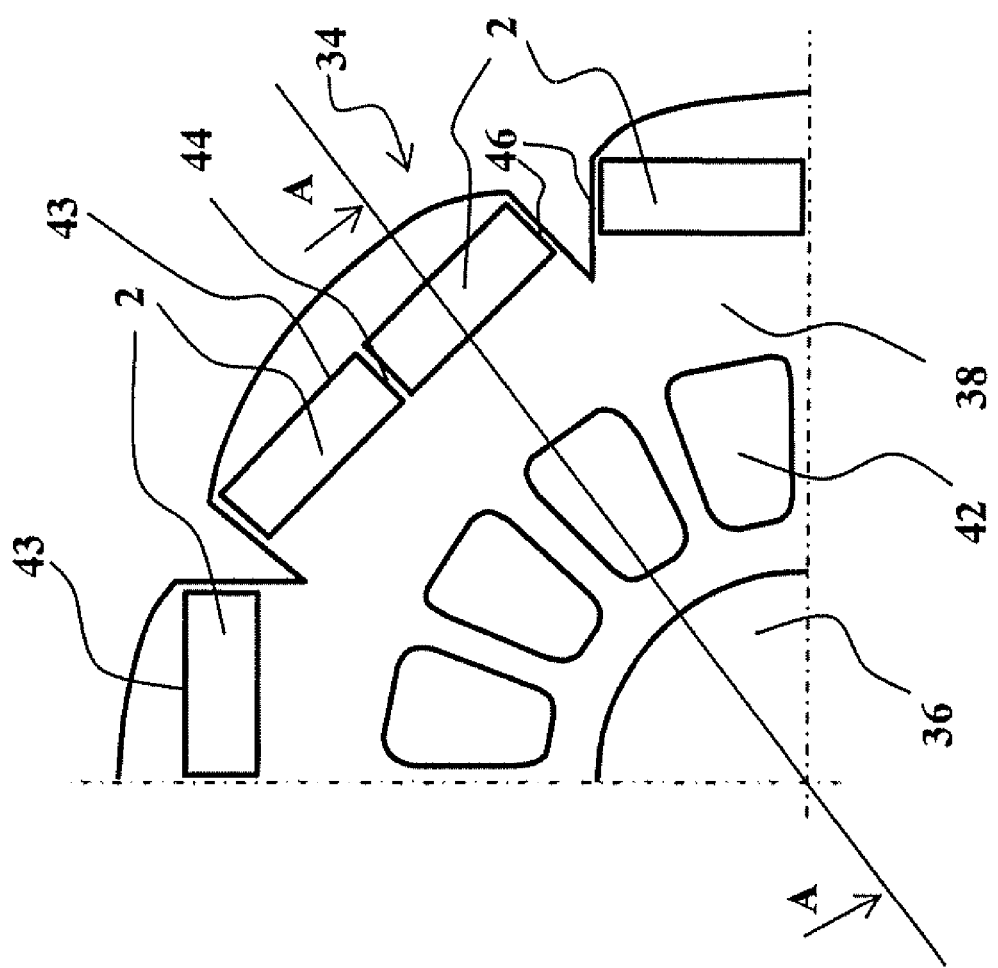
Figure 4:
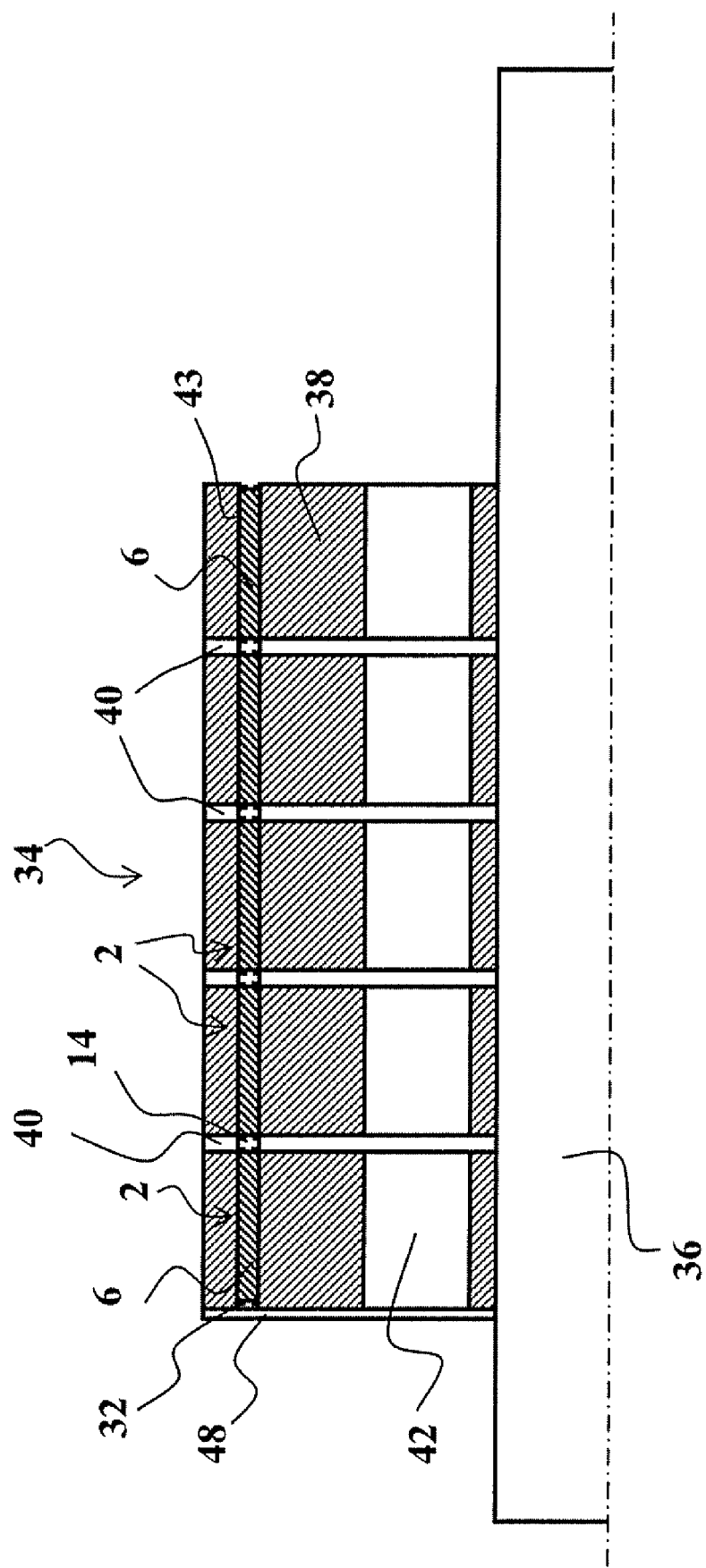
Figure 5:
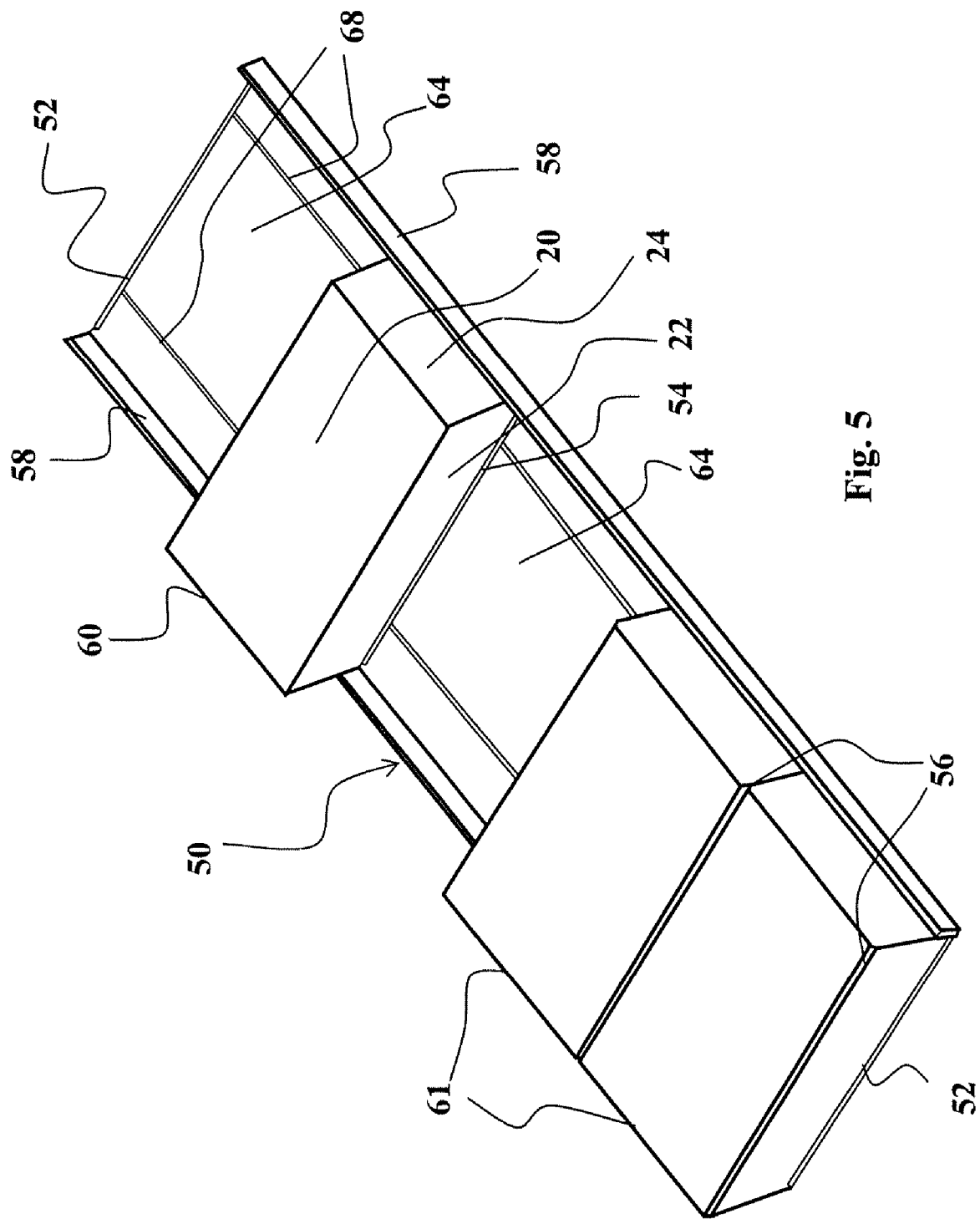
Figure 6:
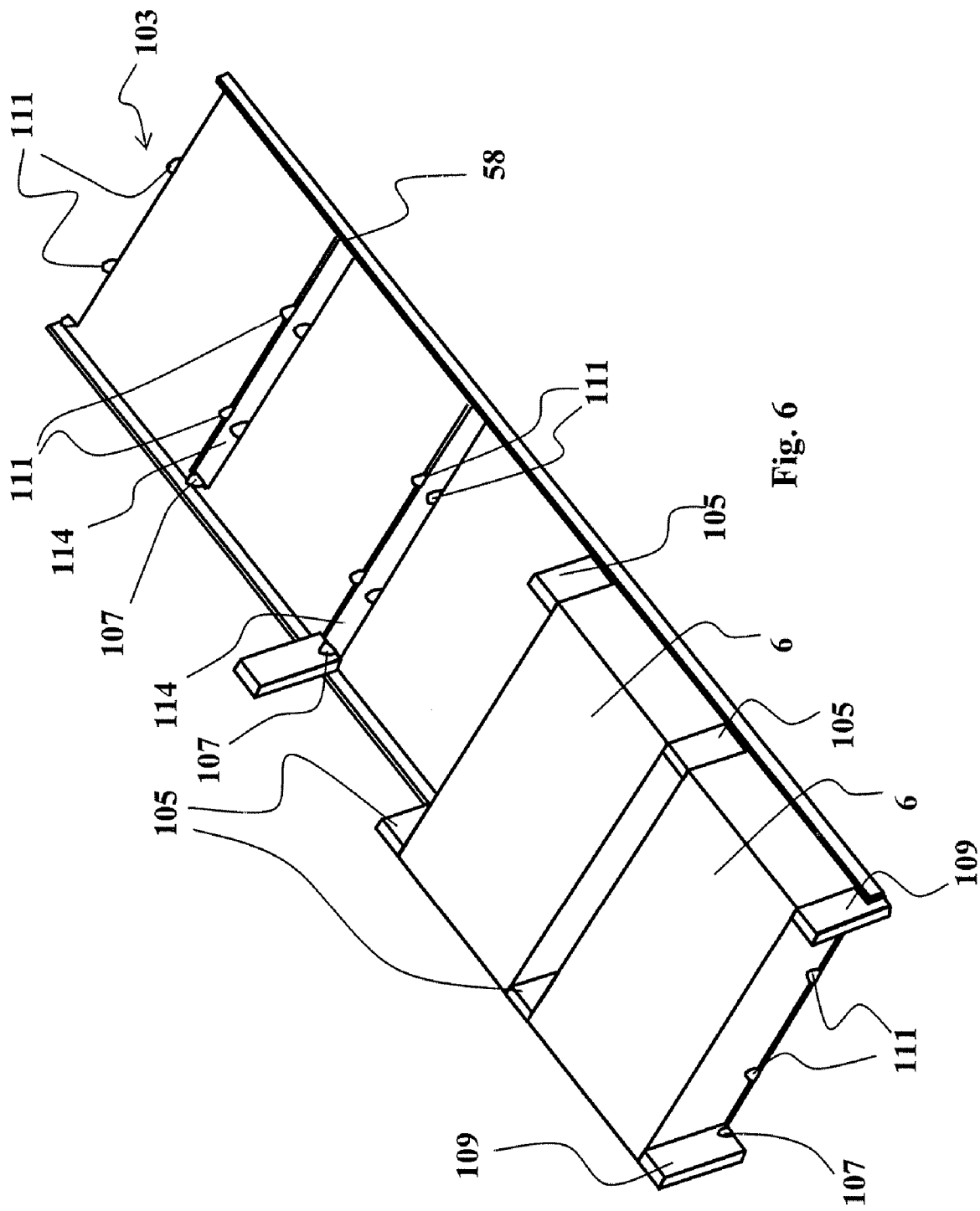
Figure 7:
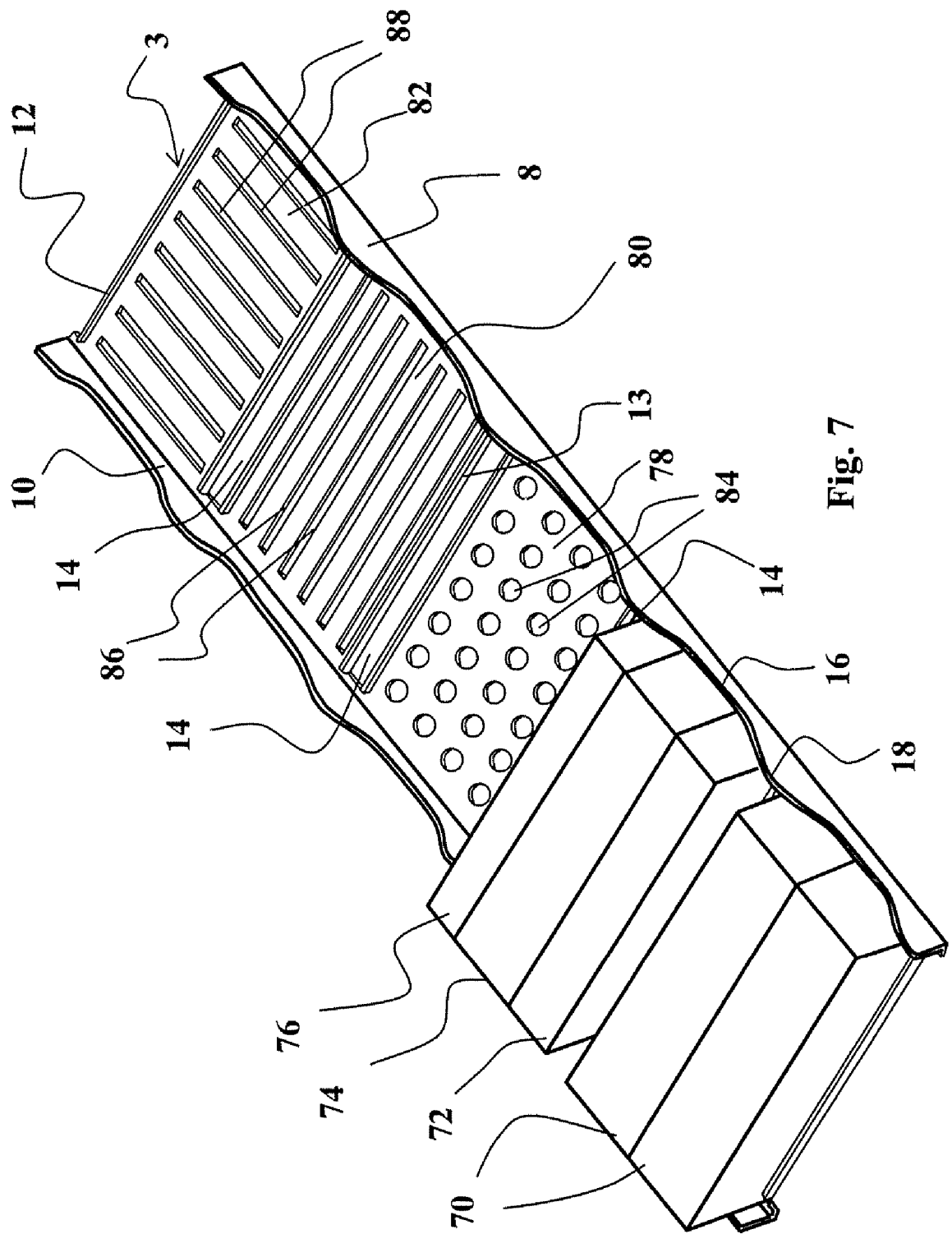

FIG. 3 illustrates a partial cross-section of the rotor according to the invention in the axial direction, FIG. 4 illustrates section A-A from FIG. 3, perpendicular to the axis, FIG. 5 illustrates part of another module according to the invention in perspective, FIG. 6 illustrates part of third module according to the invention in perspective, and FIG. 7 illustrates part of some alternative module cover and magnet structures in perspective.

Figure 1:
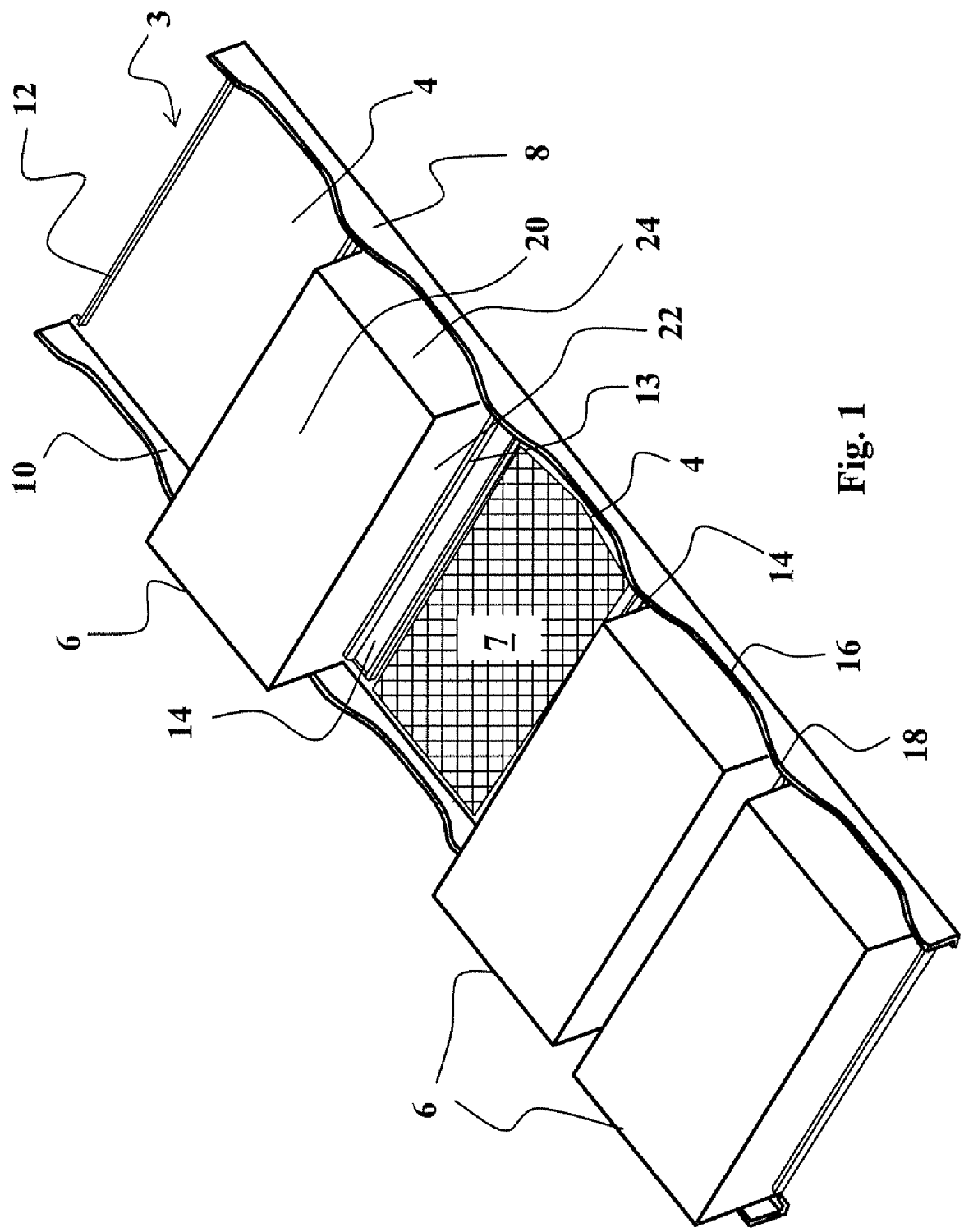
FIG. 1 illustrates part of a module according to the invention in perspective.

FIG. 1 is a perspective illustration of a module according to the invention or, to be more precise, of a module cover 3 with three permanent magnets 6 installed on the cover. The module cover 3 is manufactured from thin ferromagnetic sheet. Five smooth fastening surfaces 4 have been formed on the module cover 3. The size of the fastening surfaces corresponds to the size of the top surface 6 and bottom surface 20 of the permanent magnet. The fastening surfaces 4 are limited by side folds 8 and 10 at the edges of the module. The folds have been created by bending the edges of the cover 3 perpendicular to the fastening surface 4. Correspondingly, the end of cover 3 has end folds 12 limiting the outmost fastening surface 4 of the module. Similar intermediate folds 13 have been formed to the opposite side of the outmost fastening surface and between each fastening surface 4 in between. Thus, there are two intermediate folds 13 between two adjacent fastening surfaces 4 limiting the adjacent fastening surfaces 4 in the longitudinal direction of the module. Permanent magnets are thus supported at end surfaces 22 either by an intermediate fold 13 or an end fold 12. Openings 14 have been created on the cover 3 between consecutive intermediate folds 13. The openings are preferably made by cutting the cover sheet and folding the edges perpendicular to the fastening surface 4.

The structure of the cover 3 of the module provides the permanent magnets 6 with precise locations in which the permanent magnets 6 have been immobilized with supports in the lateral and longitudinal direction. Openings 14 are left between the permanent magnets, said openings being located at the radial ducts of the rotor in a manner described later. Glue, fixing resin or other such matter is applied to fastening surfaces 4, as illustrated by the grid pattern on the middlemost fastening surface 7.

Figure 2:
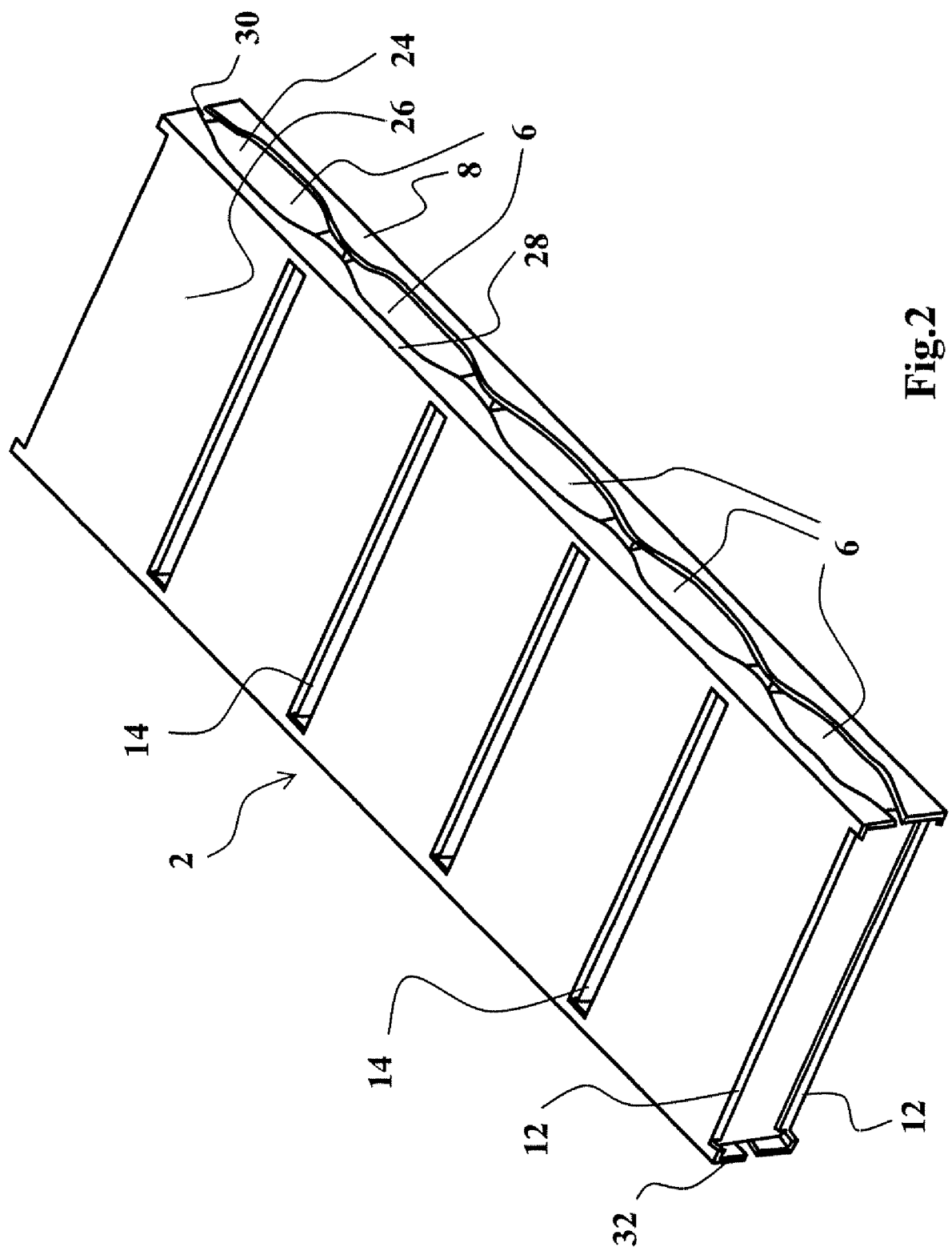
FIG. 2 illustrates a module according to the invention in perspective.

The module 2 is assembled by gluing permanent magnets 6 to the fastening surfaces 4 of the module cover 3 and then gluing another cover 3 on top of the permanent magnets 6 to form the module top surface 26 as illustrated in FIG. 2. The permanent magnets have been advantageously surface treated with epoxy paint before gluing. The permanent magnet surfaces that will not be against the module cover 3 have been protected with epoxy paint against environmental humidity and other impurities causing corrosion. A ferromagnetic cover protects the permanent magnets from above and below during installation, transportation and storage. In addition, the side folds 8 and 10 of the covers 3 protect the side surfaces 24 of the permanent magnets from external damages. A gap 30 remains between the side fold 8 of the module bottom cover 3 and the side fold 28 of the module top cover 26 at the side surface 24 of the permanent magnets, preventing the flux created by the permanent magnet from closing between the first and the second pole through the ferromagnetic cover. In the embodiment illustrated by FIGS. 1 and 2, the edges of the side folds 8, 10 and 28 have a wavelike form so that the folds are slightly lower at the permanent magnets 6 than at the openings 14. Stray fluxes between the poles of the permanent magnet are thus effectively prevented and the mechanical structure of the module is strengthened at opening 14, which may be a significant feature for long modules comprising several magnets. The edge of the side folds may also be straight, in which case its height shall be such that it adequately meets both requirements mentioned above.

According to an embodiment of the invention the permanent magnet 6 is first phosphated and then glued to the top and bottom covers 3 and 26 of the module. The assembled module is then painted as one piece by, for example, immersion. Other permanent magnet surface treatment methods and substances are also possible within the scope of the inventive idea.

The end folds 12 leave an empty area at both ends of the permanent magnet module 2. The empty area is defined by the ends 32 of the side folds 8, 10 and 28, and its length is half of the opening 14 between the permanent magnets. When several modules are installed after each other in the direction of the rotor axis, an empty space of the size of the opening 14 will remain between two adjacent modules at a radial duct of the rotor. For the last module in the direction of the rotor axis, the ends of the side folds 32 define the distance from the rotor end plate and act as support elements in the direction of the rotor axis.

FIG. 3 is a partial cross-section of the rotor 34 according to the invention, installed in an eight-pole synchronous machine according to the invention. FIG. 4 illustrates section A-A from FIG. 3. Rotor core 38, fitted on shaft 36, is manufactured from magnetically conductive sheets. The rotor consists of five consecutive core sections on the shaft, the sections being separated by a radial air duct 40 through which rotor cooling air passes in a radial direction towards the outer circumference of the rotor in a known manner. The rotor core has openings 42 in the axial direction to lighten the structure and to conduct cooling air through the rotor. At the outer circumference of the rotor, rotor poles have been formed with two parallel permanent magnet modules 2 embedded in the core. The permanent magnet modules have been fitted into openings 43 the length of the rotor, oriented to the rotor's longitudinal axis. Both modules 2 comply with the illustration in FIG. 2. There is a narrow core strip 44 between the modules in the circumferential direction and a core strip 46 between both modules and the edge of the pole. Core strips 44 and 46 support the outer section of rotor pole and the permanent magnets modules against centrifugal force.

The permanent magnet modules are installed in place by pushing them into openings 43 from the rotor end. The end 32 of the module 2 leans on the rotor end plate 48 at the other end of the rotor, resulting in the permanent magnets 6 aligning with the rotor core 38 and the openings 14 in the module 2 aligning with the radial ducts 40. Openings 43 are closed by fixing the second rotor end plate (not illustrated) to place. End plates cover the opening 43 at both ends of the rotor and lock the permanent magnet modules in place in the axial direction. The opening 43 can also be closed with a separate closing plate at the end from which the permanent magnet module is pushed into place. In this case, both rotor end plates are in place when the permanent magnet modules are installed. Fitting the modules 2 into the openings 43 always requires a gap between the module and the walls of the opening and the modules can be glued in place with resin as is known of the art.

FIG. 5 illustrates another structure of the module according to the invention. The cover 50 of a permanent magnet module is made of ferromagnetic sheet. The edges of the sheet are bent to form the side borders 58 of the module. The side borders 58 are even at the entire length of the module, but their height is such that a gap remains between the side borders of the bottom cover 50 and the top cover (not illustrated). The cover has a plane surface 64 for the permanent magnets, limited with folds or tabs 54 between the permanent magnets to separate the magnets, and correspondingly with folds or tabs 52 at the ends of the module. The shape of the permanent magnet 60 corresponds to the permanent magnet illustrated by FIGS. 1 and 2, and it has been glued from its top surface 20 to the top part of the module cover and from its bottom surface to the bottom part 50 of the module cover at plane surface 64. In this case, a narrow gap remains between the permanent magnets, defined by the width of the tab 54.

An alternative structure is illustrated in connection of the permanent magnets 61, which have been formed so that a slight bevel 56 has been cut to the top and bottom surfaces to correspond to tabs 52 and 54. Adjacent permanent magnets are thus in contact with each other at their end surfaces. In Figure longitudinal tabs 68 have also been formed to the bottom and top cover of the module. These tabs extend to the outer side of the cover, i.e. opposite to the permanent magnets. The tabs create advantageous slide and positioning surfaces when fitting the module into the rotor.

FIG. 6 illustrates third structure of the module according to the invention. The cover 103 of the module is made of a thin ferromagnetic plate. The even side folds 58 are formed on the sides of the plate as described in connection of FIG. 5. An open gap remains between the side folds of the bottom cover and the top cover, and the gap prevents the stray flux to close from one pole of the permanent magnet 6 to the opposite pole. As in the embodiment of FIGS. 1 and 2 openings 114 have been created in the cover 103 between the permanent magnets 6. Distance pieces or spacers 105 are installed on both sides of the cover 103. The spacers 105 locate between the adjacent permanent magnets 6 and their height is the same as the height of the permanent magnets 6. The spacers 105 extend thus from the bottom cover 3 to the top cover of the module. The breadth of the spacers 105 is substantially the same as the breadth of the opening 14. Thus the spacers 105 keep the permanent magnets 6 in their position in the longitudinal direction of the module. The thickness of the spacers 105 corresponds to the distance between the side fold 58 and the edge of the opening 114. A fold 107 of the cover support the spacer 105 in the cross direction of the module. The spacers 105 are made of non-ferromagnetic material, e.g. of plastics or of rubber and they glued to the permanent magnets 6 when assembling the module. Folds 111 are created on the side edges of the openings 114 to support the permanent magnets 6 in the longitudinal direction of the module. The spacers 105 make the module more solid and more inflexible because the spacers 105 lean against the top and bottom cover 103 while being attached firmly to the permanent magnets 6.

A distance piece or spacer 109 is arranged at the end of the module. The structure of the spacer 109 is the same as the structure of the spacer 105. The spacer 109 acts as a buffer when several modules are installed sequentially into the same opening 43 of the rotor.

FIG. 7 illustrates alternative module cover structures that affect the magnetic properties of the cover and that will particularly reduce eddy-current losses within the modules. FIG. 7 also illustrates various permanent magnet combinations. FIG. 7 illustrates the module cover similarly to FIG. 1, adopting the same reference members for the same parts as in FIG. 1. FIG. 7 also illustrates openings 14 that separate adjacent permanent magnet blocks from each other. The first magnet block consists of two permanent magnets 70 of equal size, in contact with each other and fitted to the first fastening surface of the cover. The second magnet block consists of three permanent magnets 72, 74 and 76, not of equal size, glued next to each other onto the second fastening surface. The three other fastening surfaces 78, 80 and 82 illustrate various module cover structures. Holes 84 have been created to the entire surface area of the cover fastening surface 78. On the fastening surface 80 there are gaps 86 transverse to the longitudinal direction of the module. The length of the gaps is substantially the same as the length of the permanent magnets to be fitted to the fastening surface. The width of the gaps 86 is approximately the same as the thickness of the cover sheet. Gaps 88 in the longitudinal direction of the module have been formed to the fastening surface 82. The length of the gaps substantially corresponds to the width of the permanent magnets. The width of the gaps also substantially equals to the thickness of the cover. The holes 84 and the long gaps 86 and 88 decrease eddy-current losses in the module.

FIG. 7 illustrates various structure solutions in different parts of a module. It must be understood that generally, one of the shown structure solutions is used for all parts of a module.

Pole markings can be added to the cover of a permanent magnet module for easy establishing of the direction of the magnets in a machine. The positions of the permanent magnets can be aligned by pressing a small bump to the module cover between adjacent permanent magnets. This way, the location of a permanent magnet can be advantageously ensured when the module contains several permanent magnets nearly in contact with each other, for example when the machine has no radial ducts or the distance of radial ducts corresponds to two or three permanent magnets.

In the above, the invention has been described with the help of certain embodiments. However, the description should not be considered as limiting the scope of patent protection; the embodiments of the invention may vary within the scope of the following claims.

The invention claimed is:

1. Permanent magnet module configured for installation in a rotor the module comprising:
    at least two permanent magnets with a first magnetic pole on a first plane surface and a second magnetic pole on a second plane surface, and
    a cover at least partially enveloping the permanent magnets,
    wherein the cover is magnetically conductive and comprises a top surface, which covers substantially the first plane surface of the permanent magnets, and a bottom surface, which covers substantially the second plane surface of the permanent magnets, and
    wherein the cover is substantially open at side surfaces of the permanent magnets.

2. The module according to claim 1, wherein the permanent magnets are at a distance from each other.

3. The module according to claim 1, wherein each permanent magnet is substantially close to an adjacent permanent magnet.

4. The module according to claim 1, wherein the top surface and bottom surface of the module are symmetrical.

5. The module according to claim 1, wherein the module has means that fix the permanent magnets in a lateral direction of the module.

6. The module according to claim 5, wherein the means fixing the permanent magnets consist of folds created at edges of the cover.

7. The module according to claim 1, wherein the top surface and bottom surface of the cover have openings in an area between the permanent magnets.

8. The module according to claim 7, wherein the module has means that fix the permanent magnets in a longitudinal direction of the module.

9. A module according to claim 1, wherein the bottom surface and top surface of the module cover have holes or gaps.

10. A module according to claim 1, wherein spacers are arranged between the permanent magnets on a side of the cover.

11. A rotor for an electrical machine, excited by embedded permanent magnets, which rotor comprises:
    a shaft; and
    a rotor core formed of magnetically conducting sheets fitted onto the shaft, whereby openings parallel to the shaft are arranged into the rotor core, into which openings the permanent magnets are fittable from the end of the rotor, wherein the permanent magnets are fitted inside a module, which has a magnetically conductive cover that covers at least pole surfaces of the permanent magnets and is substantially open at a side surface of the permanent magnets.

12. The rotor according to claim 11, wherein the rotor has radial cooling ducts and the module has openings at the ducts.

13. The rotor according to claim 11, wherein the module has means to support the permanent magnets in an axial direction of the rotor and means to support the permanent magnets in a circumferential direction of the rotor.

14. The rotor according to claim 11, wherein spacers are arranged between the permanent magnets on a side of the cover.

* * * * *